United States Patent [19]

Simmons et al.

[11] Patent Number: 4,524,441
[45] Date of Patent: Jun. 18, 1985

[54] MODULAR SPACE STAGE ARRANGEMENT FOR A T-S-T DIGITAL SWITCHING SYSTEM

[75] Inventors: Nathaniel Simmons, Downers Grove, Ill.; Sergio E. Puccini, Scottsdale, Ariz.; Stig E. Magnusson; Kamal I. Parikh, both of Phoenix, Ariz.

[73] Assignee: GTE Automatic Electric Inc., Northlake, Ill.

[21] Appl. No.: 506,746

[22] Filed: Jun. 22, 1983

[51] Int. Cl.³ ............................................. H04Q 11/04
[52] U.S. Cl. ...................................................... 370/63
[58] Field of Search ........................ 370/63, 58, 64, 68

[56] References Cited

U.S. PATENT DOCUMENTS

| 4,005,272 | 1/1977 | Collins et al. | 370/63 |
| 4,038,497 | 7/1977 | Collins et al. | 370/63 |
| 4,322,843 | 3/1982 | Beuscher et al. | 370/63 |
| 4,406,005 | 9/1983 | Simmons et al. | 370/63 |

Primary Examiner—Douglas W. Olms
Attorney, Agent, or Firm—Anthony Miologos; Peter Xiarhos

[57] ABSTRACT

A space stage for a T-S-T digital switching system is shown arranged into modular functional elements. The elements are combined allowing the space stage to grow modularly to interconnect from one to thirty-two originating time stages and terminating time stages.

5 Claims, 5 Drawing Figures

FIG.5

| TCU | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | MODULES TOTALS |
|---|---|---|---|---|---|---|---|---|---|---|---|---|---|---|---|---|---|---|---|---|---|---|---|---|---|---|---|---|---|---|---|---|---|
| SSM | 1 | | | | | | | | | | | | | | | | 3 | | | | | | | | | | | | | | | | 4 |
| SSDR | 1 | | 1 | 1 | | 1 | 1 | | 1 | | 1 | | 1 | | 1 | | 1 | | 1 | | 1 | | 1 | | 1 | | 1 | | 1 | | 1 | 1 | 16 |
| SSMC | 1 | | | 1 | | 1 | | | 1 | | | | 1 | | 1 | | 1 | | | | 1 | | | | 1 | | 1 | | | | | | 8 |
| SSMCI | 1 | | | | | | | | | | | | | | | | | | | | | | | | | | | | | | | | 1 |
| MCRD | 1 | | | | | | | | | | | | | | | | | | | | | | | | | | | | | | | | 1 |

MODULAR SPACE STAGE ARRANGEMENT FOR A T-S-T DIGITAL SWITCHING SYSTEM

BACKGROUND OF THE INVENTION

This invention relates in general to time-space-time (T-S-T) telecommunication switching systems, and in particular to a T-S-T switching system having a modularly expandable space stage.

Time-space-time (T-S-T) switching systems are a configuration of digital switching elements providing both time and space translation between channels of time division multiplexed (TDM) telecommunications transmission lines. The T-S-T network of a switching system interconnects digital bi-directional TDM communication lines with TDM communication involving the sharing of single transmission paths, individually, in time, to provide multiple channels in a single transmission medium. The construction of such a T-S-T network comprises the connection of a spacial stage between the two time stages.

Increasing the network capacity of a T-S-T digital switching system entails increasing the size of the time and space switching stages. The consequence of this network growth is that doubling the number of time stages increases the size of the space stage by a factor of two squared or 4 times.

Provisions for such network growth must be anticipated when such a T-S-T network is configured. Thus, a central exchange anticipating a certain amount of growth must ultimately install a space stage four times greater than its present requirements.

It would therefore be advantageous to provide a space stage for the T-S-T network of a digital switching system which has the capability to grow modularly with the time stage.

SUMMARY OF THE INVENTION

The space stage of the present invention is connected between the originating time stage and terminating time stage of a digital switching system and includes at least one of each of the following functional components: a space stage driver/receiver, a switching matrix, a matrix control unit including at least one control memory and a matrix control interface. The space stage driver/receiver interface connects at least one but not more than two originating time stages and terminating time stages to the switching matrix.

The switching matrix includes a plurality of input and output lines and is arranged to selectably form connections between each input line and output line. Each input line and output line is connected via the space stage driver/receiver to the originating time stage and terminating time stage respectively of the switching network. The matrix control unit connects the switching matrix to a central control complex via the matrix control interface. The central control complex is arranged to write control information into the matrix control units control memory. The control information written into the memory enables a select connection from an input line to an output line through the space stage matrix.

Depending on the size of the switching matrix and the amount of input and output lines available, a space stage driver/receiver may be added for each two originating time stages and terminating time stages added to the switching network. Likewise, since each matrix control unit includes four control memories an additional matrix control unit is added to the space stage for each four terminating time stages connected to the space stage. A matrix control interface can connect from one to eight matrix control units to the central control complex.

Therefore, with the addition of the requisite amount of space stage functional components the space stage of the present invention can grow modularly to connect from one to a plurality of originating time stages and terminating time stages.

DESCRIPTION OF THE DRAWING

FIG. 5 is a growth table illustrating the manner in which the space stage of the present invention can grow modularly to handle from one to thirty-two originating time stages and terminating time stages.

DESCRIPTION OF THE PREFERRED EMBODIMENT

Figure 1:
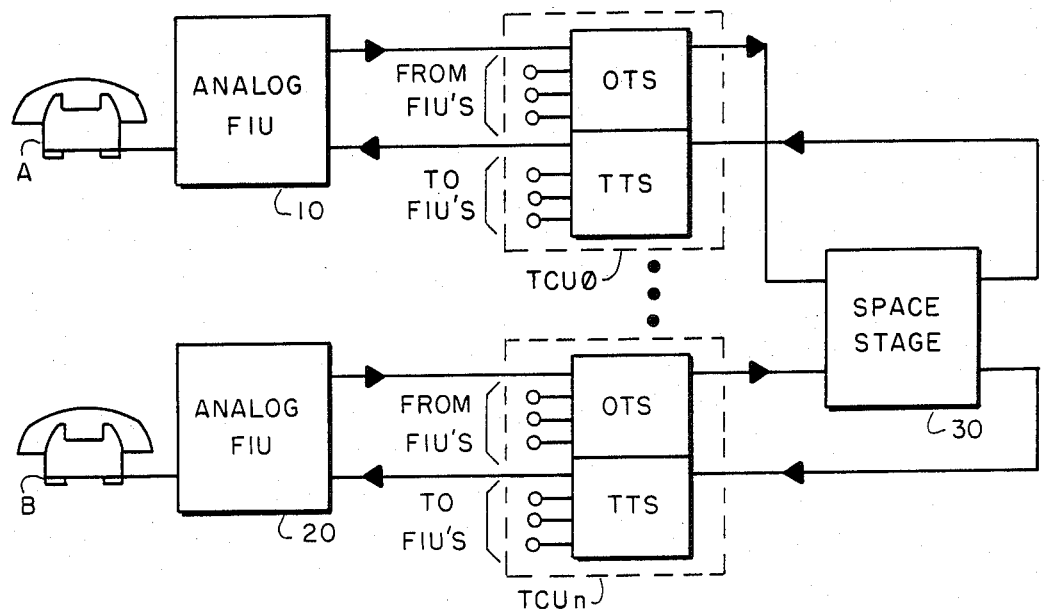
FIG. 1 is a block diagram depicting the network structure of a digital switching system.

FIG. 1, is a block diagram showing the single rail structure of a time-space-time network of a digital switching system for switching a local telephone call. Telephone subscriber A is connected to analog facility interface unit (FIU) 10. The analog FIU has a PCM voice connection to time and control unit (TCU) 0. The digital switching network may contain n number of TCUs, but will be limited to 32 TCUs for this embodiment. Each TCU has two time stages associated with it, an originating time stage (OTS) and a terminating time stage (TTS).

Each time stage (OTS or TTS) of each TCU may be connected to up to four FIUs. The number of time and control units (TCUs) is modularly expandable and may grow to fit the needs of the switching system.

Next, a connection is made from the OTS of the particular TCU, in this example TCU 0 to the space stage 30 and the terminating time stage of TCU n. The telephone subscriber B is then connected through analog FIU 20 to the TTS of TCU n.

A voice transmission link is next established from subscriber B to subscriber A. This communication link is established via analog FIU 20, through the originating time stage (OTS) of TCU n, through space switch 30, through the terminating time stage (TTS) of TCU 0, and finally through analog FIU 10 to subscriber A. At this time, a two way talking path has been established between subscriber A and subscriber B.

Figure 2:
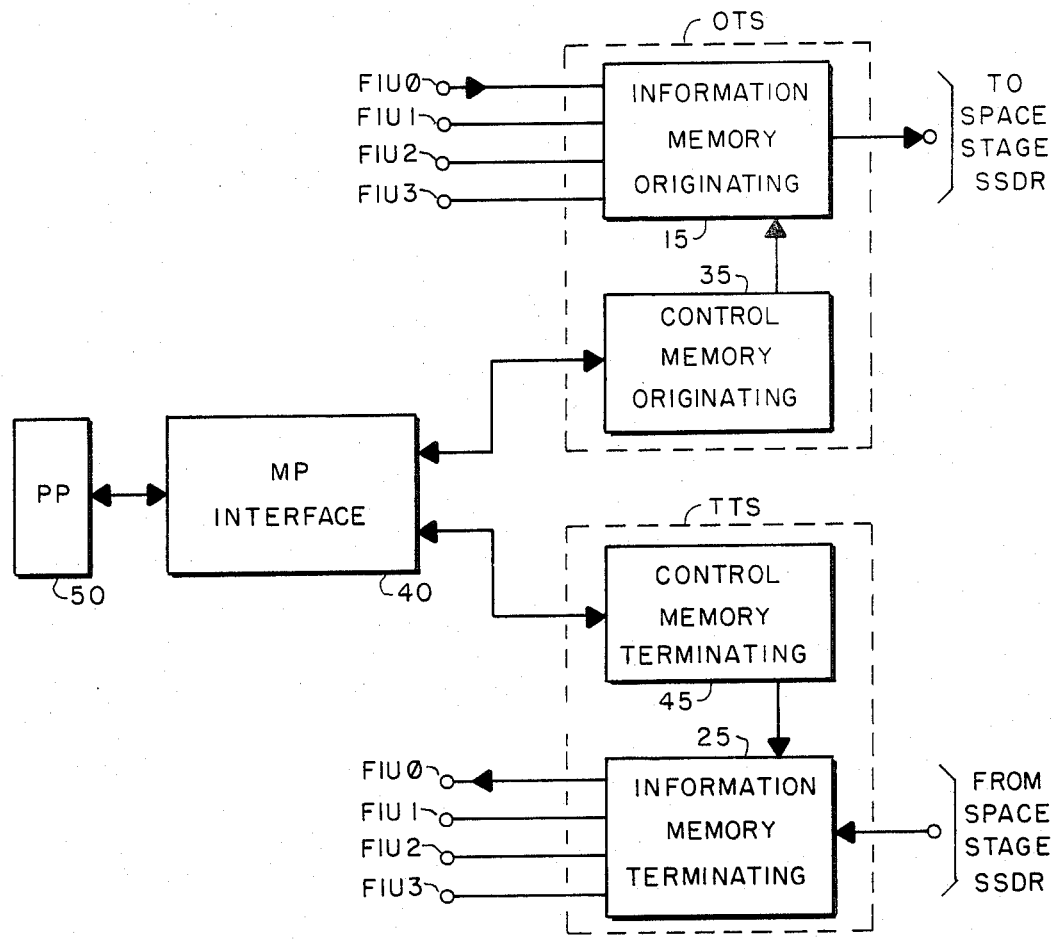
FIG. 2 is a block diagram showing the originating and terminating time switching stages used with the space stage of the present invention.

FIG. 2, shows the connections of a particular TCU to a corresponding microprocessor CPU controller. The CPU 50 is a distributed peripheral processor (PP). This processor may comprise the INTEL 8086 microprocessor or other similar INTEL unit. Each stage of a time and control unit (TCU) includes an information memory and a control memory. For example, the originating time stage (OTS) shown includes information memory originating (IMO) 15 and control memory originating 35. Microprocessor interface 40 connects peripheral processor 50 to each of the control memories. These connections include an address and data bus and suitable controls for reading and writing the memory, along with clock signals. The information memories 15, 25 each contain information memory units with PCM samples. Each TCU has a capability of being connected to four FIUs. Each FIU provides for 193 channels of information to be transmitted to the information memory. Two groups of 193 channels comprise an information rail in a single rail system with the system having the capability of transmitting via a second rail (not shown) when configured as a duplex system. Therefore, in the single rail system of the present embodiment the rail shown may contain up to 386 channels of information.

Each information memory is further connected to the space stage through a space stage driver/receiver (SSDR) (not shown in this figure). Each information memory contains PCM samples representing the amplitude and sign of the voice signal. Twelve bits are required to represent the voice signal, seven bits representing the amplitude of the voice signal, one bit represents the sign of the voice signal, three bits of supervisory signals and one parity bit.

Each control memory originating 35 and control memory terminating 45 contains data which is provided by the peripheral processor 50 and defines the input/output time slot relationship of its associated information memory originating (IMO) 15 and terminating (IMT) 25 respectively. Each channel originating from an FIU is assigned a pre-defined time slot address in the IMO 15.

Figure 3:
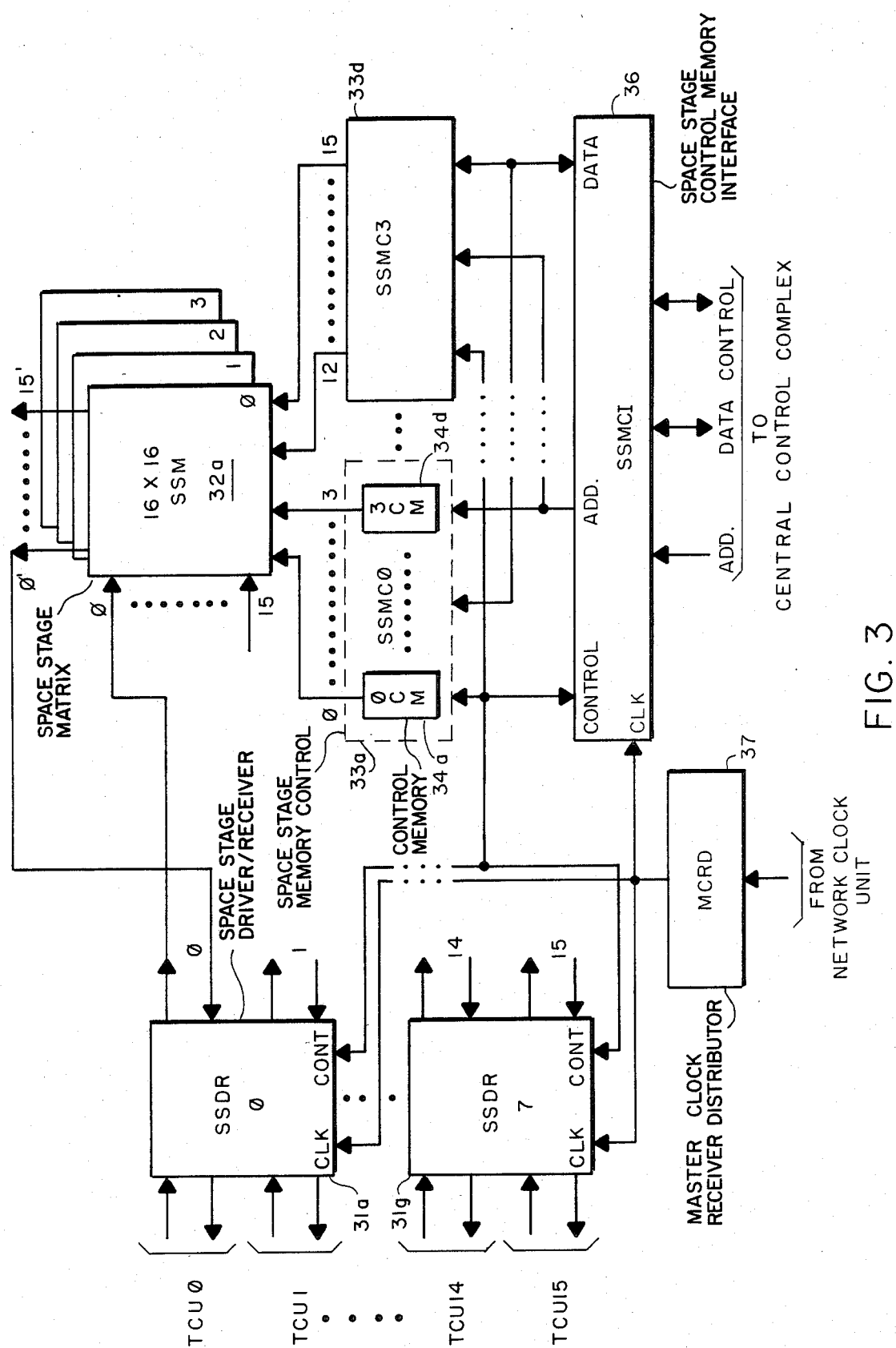
FIG. 3 is a schematic diagram of the space stage of the present invention configured to interconnect one to sixteen originating time stages and terminating time stages.

Turning now to FIG. 3, a block diagram of the space stage of the present invention is shown. PCM samples enter and exit the space stage through a space stage driver/receiver (SSDR) interface 31a–31g, which connects to the information memory originating (IMO) and information memory terminating (IMT) of each associated TCU. For example, IMO 15 and IMT 45 of the OTS and TTS, respectively, illustrated in FIG. 2. Each SSDR includes drivers and receivers as well as buffers for temporarily storing the PCM sample before it is sent out to the space stage matrix (SSM). Each SSDR 31a–31g can interface two TCUs to the space stage. The space stage matrix (SSM) 32a provides a time shared switching path between an OTS and TTS of an individual TCU or between an OTS and TTS of different TCUs. The SSM 32a is constructed from a plurality of 16:1 multiplexers. The multiplexers are combined into a 16×16 switch matrix that is 3-bits wide. Since the PCM sample used is 12-bits in width, four slices (SSMs 0–3) are combined forming a 16×16 SSM which is 12-bits wide. Control signals applied to each multiplexer select and enable the appropriate multiplexers for switching through the SSM 32a.

The control signals are applied to the SSM 32a via the space stage memory control (SSMC). Each space stage memory control 33a–33d consists of four control memories (CM) 34a–34d and their associated buffers. Each control memory 34 corresponds to a particular TCU terminating time stage. Each CM selects, through control data written within the CM, which one of the sixteen input samples will be output. Address and data information are read into the CM 34a–34d via a space stage control memory interface (SSCMI) 36. SSCMI 36 controls the reading and writing of each CM from a central control complex. Finally, a timing generator or master clock receiver distributor (MCRD) 37 is included which provides all the necessary timing signals for the operation of the space stage. The MCRD terminates a master clock signal from a network clock unit (NCU) and distributes a timing reference to the SSDRs 31a–31g, the SSMCs 33a–33d and SSCMI 36.

With renewed reference to FIG. 3, a description of the operation of an SSU will be explained. PCM samples from the OTS are written into a buffer within the appropriate SSDR, addressed and strobed with timing signals transmitted from the sending TCU with the PCM samples. The written sample is latched out to the space stage matrix one time slot after the sample was written into the SSDR. This time slot is referred to as n+1. In time slot n, before time slot n+1, a path through the SSM is selected by reading the control memory within the appropriate SSMC. At the beginning of time slot n+1 the data written in the CM enables the appropriate multiplexers within the SSMU used to output the PCM sample. The PCM sample available at the SSDR buffer at the beginning of time slot n+1 is allowed to ripple through the addressed multiplexers and latched into the selected SSDR for transmission to a TCU near the end of time slot n+1.

Again in our example, the data written in 34a sets up a path through the SSM 32a from the 0 input to the 0′ output. The PCM sample is latched into the appropriate buffer within SSDR 31a and sent to the IMT 25 of TCU 0. Since each CM is associated with a particular TCU terminating time stage, the sample is easily switched through the SSM by writing the appropriate data in a control memory. For instance, if a connecting path is required between TCU 0 and TCU 14, PCM samples from the OTS of TCU 0 are latched into SSDR 31a for transmission to the space stage matrix 32a. The central control complex via the SSMCI 36 selects and writes control data into CM 14, (not shown) located within SSMC 33d. The read contents of the control memory enables the appropriate set of multiplexers to select which of the sixteen inputs (0–15) will be output, in this example input 0. At the appropriate time slot, the sample on SSM 32a input 0 is latched into SSDR 31g on output line 14. SSDR 31g then transmits the sample to the TTS of TCU 14.

The space stage shown in FIG. 3, can grow modularly from a network having only one TCU to sixteen TCUs. One SSM 32a, SSMCI 36, and MCRD 37 are required for one as well as sixteen TCUs. Each SSDR can interface two TCUs to the space stage matrix 32a. Therefore, if three TCUs are in the time stage, two SSDRs 31a and 31b are required to interface to the SSM 32a. One SSDR must be added and connected to the SSM 32a for every two TCUs added to the time stage up to a total of eight SSDRs 31a–31g. Each SSMC includes four control memories (CM), with each CM corresponding to a TTS of an associated TCU. Therefore, one SSMC can provide control memories for 1–4 TCUs inclusive. If a fifth TCU is connected to the time stage, a second SSMC would be required. Since each SSMC can handle four TCUs, a total of four SSMCs 33a–33d would be required if all sixteen TCUs were installed.

The next logical step in growth would be to increase the space stage to handle growth beyond the sixteenth TCU.

Figure 4:
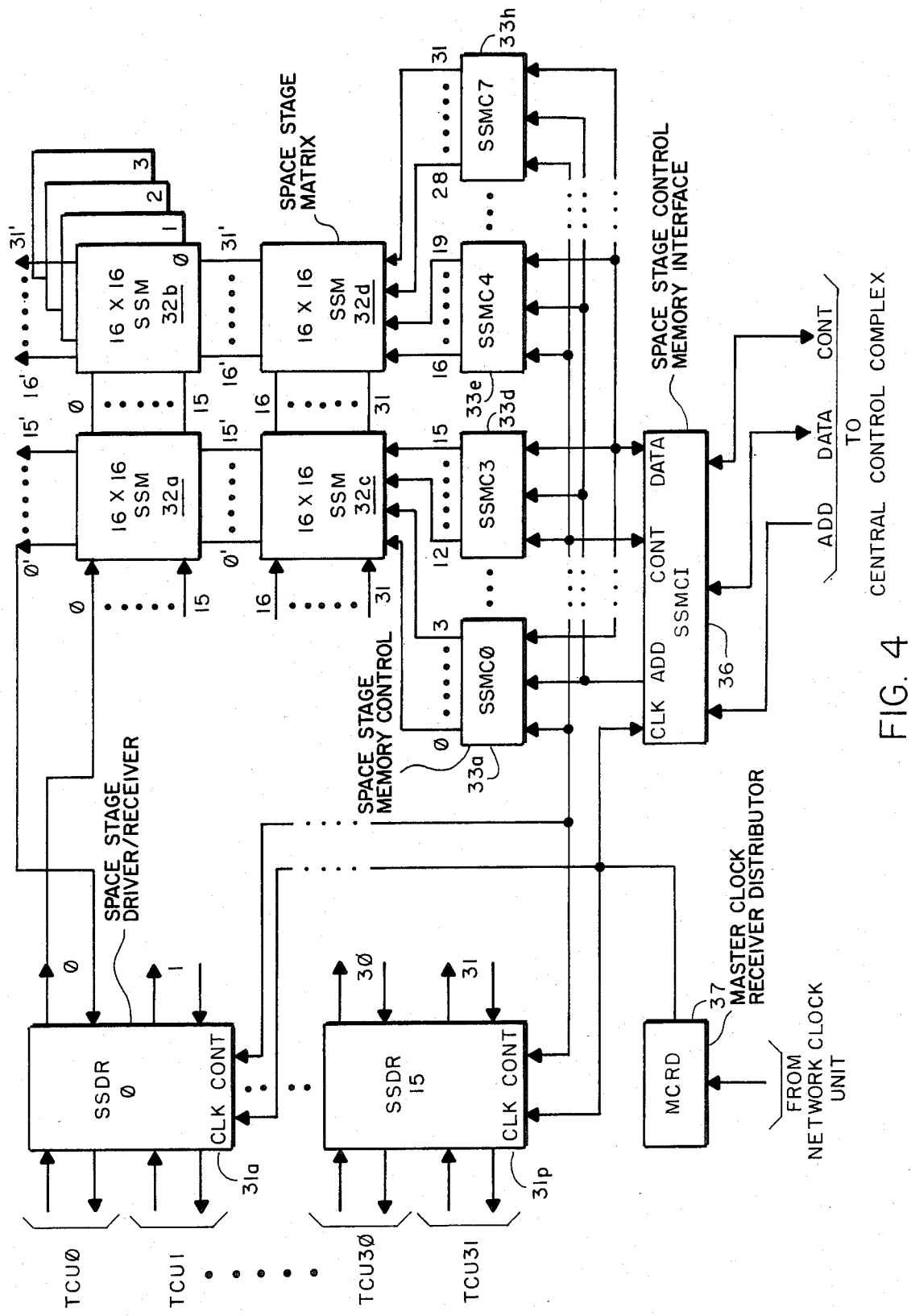
FIG. 4 is a schematic diagram of the space stage of the present invention configured to interconnect one to thirty-two originating time stages and terminating time stages.

Turning now to FIG. 4, the growth scheme for up to thirty-two TCUs is illustrated. In order to accommodate a maximum of thirty-two TCUs the 16×16 basic space stage matrix (SSM) must grow by four times. As can be seen, the space stage illustrated in FIG. 4 is comprised of four 16×16 SSMs 32a-32d arranged into a 32×32 SSM. The SSM in turn can be connected to a maximum of thirty-two TCUs via the appropriate number of SSDRs. With each SSDR able to interface two TCUs, sixteen SSDRs, 31a-31p are required. The required amount of control memories (CM) to operate the space stage also must be doubled to handle the larger SSM. Therefore, eight SSMCs 33a-33h must be used. Each SSMC has four CMs providing control switching to the TTS stages of four TCUs. Only one master clock receiver distributor (MCRD) 37 is required to provide the requisite timing from the NCU.

With the space stage equipped to handle sixteen TCUs as illustrated in FIG. 3, the expansion to the seventeenth TCU would require the addition of four SSMs 32a-32d forming the space stage matrix of FIG. 4, having thirty-two inputs (0-31) and thirty-two outputs (0'-31'). Accordingly, to effectively handle the seventeenth TCU an additional SSDR 31h and SSMC 33c would be required. A progressive expansion to the thirty-second TCU would be accomplished by adding the requisite SSDRs and SCMCs in accordance with the growth table of FIG. 5.

Therefore, the space stage in the T-S-T network of the present invention can be expanded readily to handle from one to thirty-two TCUs, by the addition of only those modules (SSDRs, SSMCs, etc.) necessary for connection to the number of TCUs in the time stage.

It can be well appreciated by those skilled in the art that even though a single rail arrangement has been illustrated, a second duplicate copy of the space stage can be used in those T-S-T networks employing A and B rails. For example, a fully independently operating space stage would handle all time shared switching paths between TCUs on the A rail and similarly a second space stage would handle all switching between TCUs on the B rail. Both space stages would be identical to the other working independently handling switching between the TCUs connected to their respective rails. Thereby, the space stage described in this embodiment may be copied identically for each rail and is not limited thereto.

It can be appreciated that each one of the functional modules of FIG. 3 and FIG. 4, i.e. SSCMI, SSDR and SSM can be configured into circuit cards. The circuit cards in turn can be plugged into unit frames having a backplane arrangement for interconnecting the signals between the cards. The SSDRs could be connected to the TCUs via pluggable cables thereby, simplifying backplane wiring and the interconnections between the time stage and switch stage of the T-S-T network.

The present invention has been described with reference to a specific embodiment thereof, for the purpose of illustrating the manner in which the invention may be used to advantage. It will be appreciated by those skilled in the art that the invention is not limited thereto. Accordingly, any and all modifications, variations or equivalent arrangements which may occur to those skilled in the art should be considered to be within the scope of the invention.

What is claimed is:

1. In a time-space-time network capable of expanding from one to a plurality of originating time stages and terminating time stages, a space stage comprising:

a switching matrix including a plurality of multiplexer units connected together to form a space stage matrix having a plurality of input lines and a plurality of output lines each of said plurality of multiplexer units including control inputs;

a plurality of space stage driver/receiver interfaces each space stage driver/receiver interface connecting a maximum of two originating time stages and two terminating time stages to a corresponding two of said plurality of input lines and plurality of output lines respectively of said space stage matrix;

a plurality of space stage matrix control units each of said plurality of space stage matrix control units including four control memories, each control memory associated with an individual one of said space stage matrix output lines and said multiplexer units control inputs connected to a respective space stage matrix control unit; and a matrix control interface connecting a central control complex to said matrix control units, said central control complex arranged to write control information to one of said control memories enabling a selected connection through said space stage from one of said plurality of originating time stages to one of said plurality of terminating time stages.

2. The space stage as claimed in claim 1, wherein: each of said control memories is connected to respective multiplexer unit control inputs whereby, responsive to control information written in each control memory a respective one of said plurality of space stage matrix input lines is connected to said control memories associated space stage matrix output line.

3. The space stage as claimed in claim 2, wherein: said matrix control interface includes a data, control and address bus connected to each of said control memories and to said central control complex enabling control information from said central control complex to be written in each of said control memories.

4. The space stage as claimed in claim 1, wherein: said space stage matrix includes sixteen inputs and sixteen outputs enabling selectable connections through said space stage matrix from sixteen originating time stages to sixteen terminating time stages.

5. The space stage as claimed in claim 4, wherein: three additional space stage matrices are connected together forming a space stage matrix having thirty-two inputs and thirty-two outputs enabling selected connections through said space stage matrix from thirty-two originating time stages to thirty-two terminating time stages.

* * * * *